United States Patent [19]

Morikawa et al.

[11] Patent Number: 4,904,491
[45] Date of Patent: Feb. 27, 1990

[54] METHOD FOR PRODUCING DOUGH FOR BREAD OR PASTRY

[75] Inventors: Michio Morikawa; Torahiko Hayashi; Yasunori Tashiro; Hirobumi Mugishima; Nobuo Ban, all of Tochigi, Japan

[73] Assignee: Rheon Automatic Machinery Co., Ltd., Tokyo, Japan

[21] Appl. No.: 302,162

[22] Filed: Jan. 25, 1989

[30] Foreign Application Priority Data

Jan. 27, 1988 [JP] Japan .................................. 63-16384

[51] Int. Cl.⁴ .............................................. A21C 3/02
[52] U.S. Cl. ................................... 426/502; 426/503; 426/517; 425/142; 425/164
[58] Field of Search ........................ 426/502, 503, 517; 425/142, 164

[56] References Cited

U.S. PATENT DOCUMENTS

4,276,317  6/1981  Hayashi .............................. 426/502
4,583,930  4/1986  Hayashi .............................. 426/502
4,676,727  6/1987  Atwood .............................. 425/164

Primary Examiner—Donald E. Czaja
Assistant Examiner—H. Pratt
Attorney, Agent, or Firm—Guy W. Shoup; Gideon Gimlan

[57] ABSTRACT

A method is provided for producing dough for bread or pastry in which no excessive pressure is imparted to the dough. In this method kneaded dough is divided into dough portions, each portion is weighed, and the dough portions are placed to occupy a space proportional to the weight of each portion. By regulating the width and thickness of each portion, a dough strip having uniform dimensions is provided. Then shaped dough pieces are processed through cutting and shaping steps. The possibility of the gluten network being damaged by an excessive pressure is eliminated. Thus puffy and tasty bread or pastry made of such dough, and having an excellent quality, can be provided when the dough is baked.

15 Claims, 6 Drawing Sheets

METHOD FOR PRODUCING DOUGH FOR BREAD OR PASTRY

BACKGROUND OF THE INVENTION

1. Field of the Invention

This invention relates to a method for producing in a fully-automated process bread or pastry having an excellent quality.

2. Prior Art

U.S. Ser. No. 213,753 (filed on June 30, 1988), which is the earlier application of the assignee of this application, discloses a method for producing bread of a good quality from frozen dough. In this method the dough is stretched while it is subjected it to vibrations so that the dough can be stretched without imparting pressure exceeding the yield point of its elasticity. Thus the gluten network structure is unharmed. Then the dough is frozen to preserve it. After a desired preservation period, the dough is baked. Since the dough does not become deflated, but expands further during the baking step, puffy and tasty bread results. In this method, the stretching step is usually performed by a stretching apparatus like that in FIGS. 3, 4, and 7, in the earlier application. Conventionally, an operator manually regulates the thickness and width of the dough mass and then provides it to the apparatus. Otherwise, the dough mass is supplied from a dough supply device.

U.S. Pat. No. 4,192,636 discloses a typical stretching machine suitable for the above-mentioned method and a dough supply device. As shown in FIG. 1 of this patent, dough is supplied from the hopper to the stretching apparatus.

However, since the dough adheres to the wall adjacent the exit, making the exit port smaller, it readily stops at the exit port of the hopper, and it is difficult to supply the dough at a substantially constant flow rate. Further, since the dimensions of the dough are not regulated before it is conveyed into the space between the roller mechanism and the conveyors of the stretching apparatus, the dough is subjected to excessive pressure. If part of the dough supplied to the stretching apparatus is too thick, a turbulent flow is generated in it when it enters the space. Especially, in the case of bread dough, its gluten structure tends to be destroyed due to this pressure. Therefore, the dough pieces made of such damaged dough become readily deflated during the baking step and do not have a good quality. The same situation arises in other types of dough supply devices such as flow-rate regulating machines.

U.S. Ser. No. 175,103 (filed on Mar. 30, 1988), which is an earlier application of the assignee of this application, discloses an apparatus and method for supplying dough from a hopper to a stretching apparatus while the dimensions of the dough are regulated. Further, in this method no excessive stress that might harm the gluten network structure of the dough is imparted to the dough.

Therefore, the inventor of this application conceived that a method for producing dough for bread or pastry in which the dough is automatically supplied and stretched without harming the gluten network structure of the dough can be provided by combining the features of U.S. Ser. Nos. 213,753 and 175,103.

SUMMARY OF THIS INVENTION

One object of this invention is to provide a method for producing dough for bread or pastry in which dough is automatically supplied and stretched without harming the gluten network structure of the dough.

Another object of this invention is to provide a method for producing dough for bread or pastry whose dough is frozen and preserved for a long period and whose same quality is maintained.

In this invention a method for producing bread or pastry is provided, comprising the steps of (a) mixing and kneading various materials such as yeast, water, sugar, flour, or the like required for producing a desired type of bread, to make a dough mass, (b) dividing the dough mass into portions, (c) weighing each of said dough portions, (d) placing said dough portions serially on a feed conveyor so as to cause each of said dough portions to occupy a space proportional to the weight of each said dough portion, (e) regulating the width and thickness of each said portion to form said dough portions into a continuous dough strip of uniform dimensions, (f) cutting and shaping said dough strip into dough pieces of a desired form, and (g) fermenting said dough pieces.

In this method, since the dimensions of the dough are regulated before it is stretched, no pressure liable to harm the gluten network structure in the dough is imparted to the dough when it is stretched by a stretching machine.

Further, since throughout the process no pressure exceeding the yield point of the dough's elasticity is imparted to mold the dough, when it is baked it expands and produces puffy and tasty bread or pastry having an excellent quality.

EMBODIMENT

Figure 1:
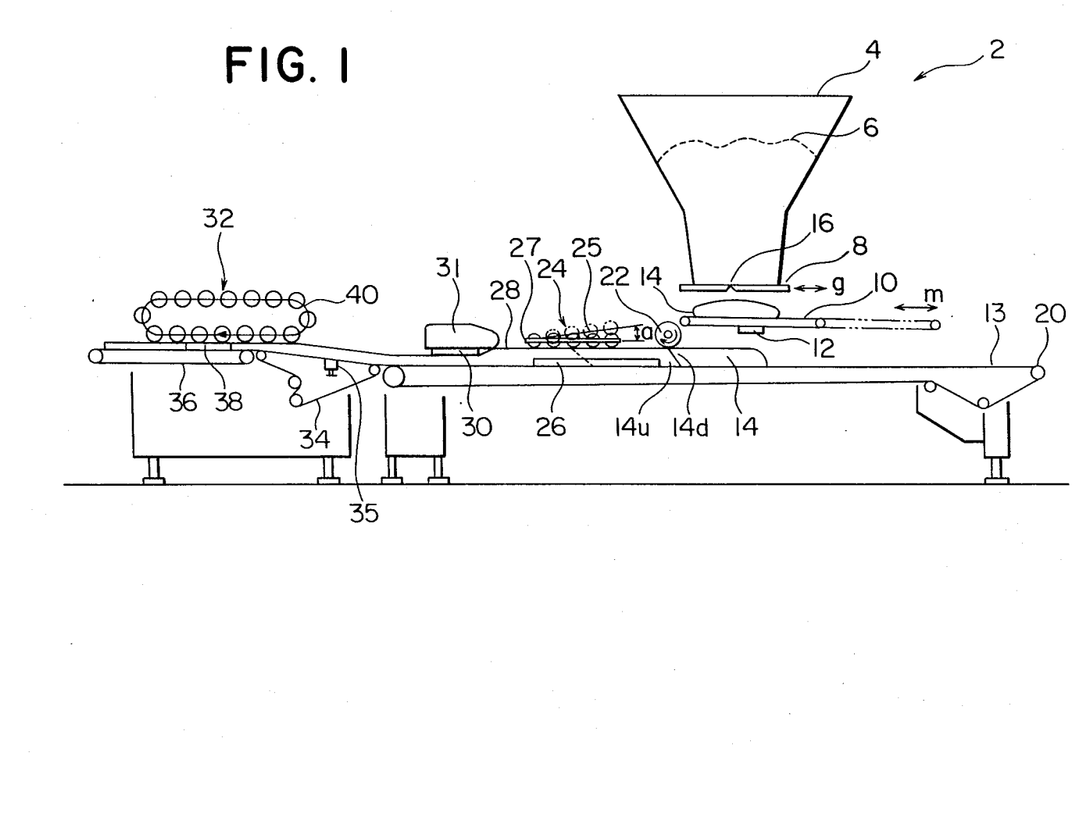
FIG. 1 shows an apparatus in which the first half of the method of this invention is performed.
Figure 2:
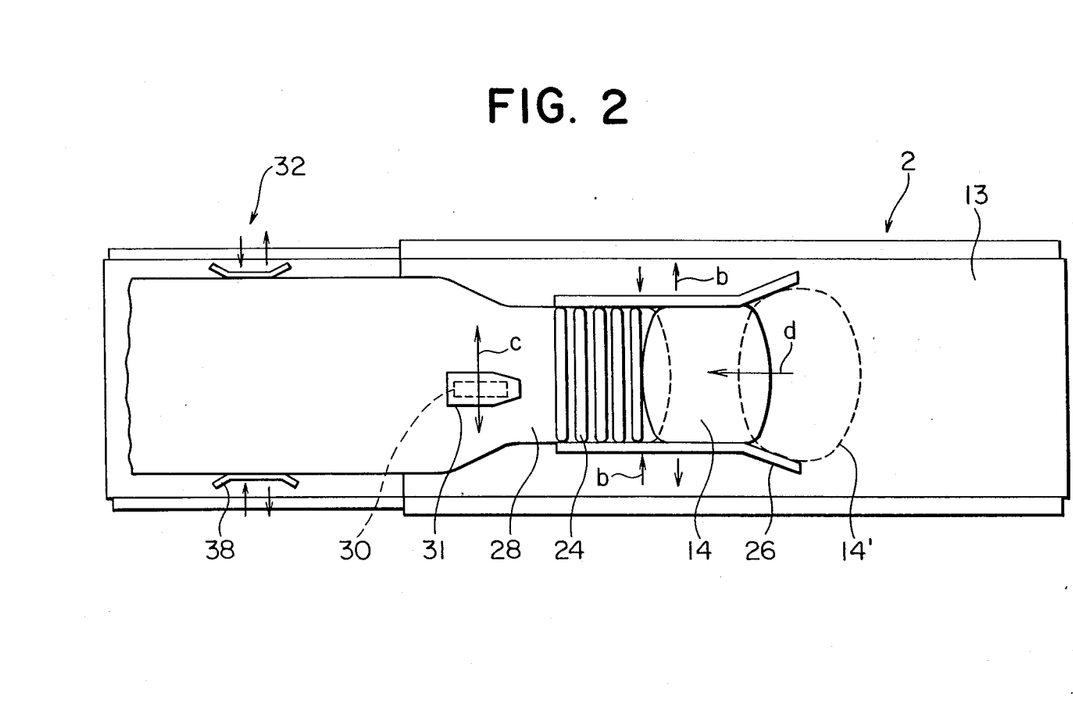
FIG. 2 shows a plan view of the transfer conveyor of the apparatus shown in FIG. 1.

The steps consisting of the first half of the method of this invention, in which a dough strip having uniform dimensions is provided, is performed by the apparatus (2) in FIGS. 1 and 2. Therefore, these steps will now be explained by reference to the apparatus (2).

The apparatus (2) comprises a hopper (4), for containing and feeding a dough mass (6), having a divider (8) at its bottom, and a weighing and supplying conveyor (10) having a weighing device (12) for measuring the weight of the dough portion (14) divided and supplied from the hopper (4), and a feed conveyor (13) disposed underneath the weighing and supplying conveyor (10) for transferring the dough portions (14) received from the weighing and supplying conveyor (10).

Figure 3:
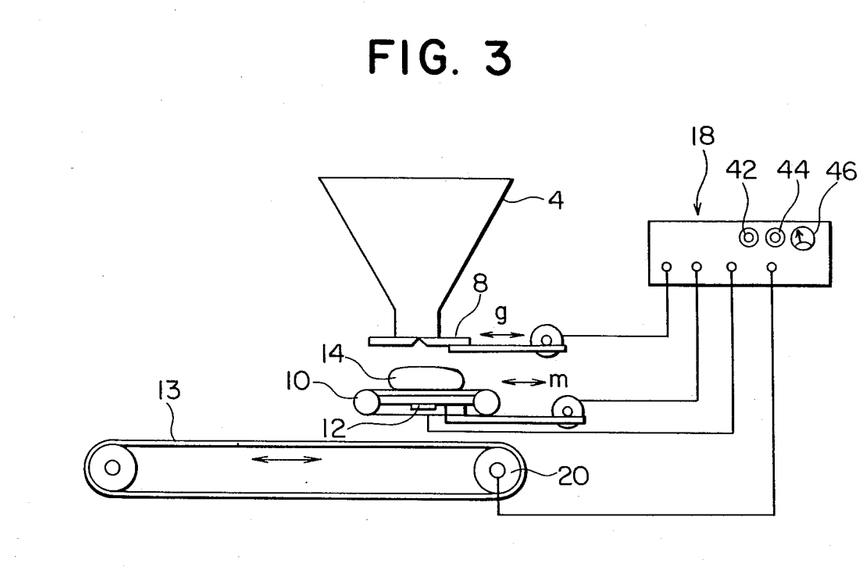
FIG. 3 shows the control unit of the apparatus shown in FIG. 1.

The divider (8) has a conventional structure, and, in this embodiment, a pair of cutter blades disposed at the bottom of the hopper (r) and arranged to move horizontally, as indicated by arrows g in FIGS. 1 and 3, to close and open an exit port (16) of the hopper. When the exit port is open, a portion of the dough progresses onto the weighing and supplying conveyor (10), which is positioned directly underneath the exit port (16). When the exit port (16) is closed, a certain amount of a dough portion is divided by the cutter blades and placed on the conveying surface of the weighing and supplying conveyor (10).

By this cutter structure it is possible to minimize any harm that would be caused to dough if any other type of a conventional dough supply device, such as a rotary valve or piston cylinder assembly, were to be used. In such a conventional dough supply device, a recess in the valve receives dough, and then the valve rotates to the position where the recess communicates with the piston cylinder at one end and an exit port at the other end so that the dough in the recess is extruded by the piston from the exit port. Such a dough supply device tends to harm the gluten tissue of the dough while it is being subjected to the severing action of the valve and the pressure from the piston.

The dough portion (14) on the weighing and supplying conveyor (10) is weighed by the weighing device (12) of a conventional structure. As will be discussed in more detail below, information regarding the weight of the dough portion (14) is stored in a memory of a control unit (18) shown in FIG. 3.

The weighing and supplying conveyor (10) is positioned underneath the exit port (16) of the hopper (4) and moves reciprocally and horizontally as indicated by arrows m in FIGS. 1 and 3. The conveyor (10) is a belt conveyor driven intermittently. Its belt is not driven when it receives a dough portion (14). After it receives a dough portion it moves rearwardly, that is, in the upstream direction of the apparatus (2), while its belt starts to be driven forwardly. Since the weighing and supplying conveyor (10) moves rearwardly at the same speed as the driven speed of the belt, the dough portion (14) drops onto the area of the transfer conveyor (13) directly underneath the position where the dough portion (14) is placed on the weighing and supplying conveyor (10).

The upstream end driven roller of the transfer conveyor (13) comprises an encoder (20). The encoder (20) has a conventional structure and, in this embodiment, comprises a counter that senses and counts the number of marks provided on the endless belt at a selected interval so that the travel distance of a point on the belt can be readily calculated.

Above the conveyor path of the transfer conveyor (13), and downstream of the area to which the dough portion (14) is supplied, a single roller (22) is placed.

The single roller (22) is rotatable about its axis, which axis is positioned transverse to the direction of the movement of the dough portion (14) on the transfer conveyor (13). Downstream of the single roller (22), a thickness-defining device (24) and width-defining members (26) are mounted to the frame (not shown) of the transfer conveyor (13) and positioned above the conveyor. The single roller (22) functions as a preliminary thickness-defining device. That is, the roller presses the dough portion (14) to make its thickness more uniform so that the dough portion (14) can be more readily handled by the thickness-defining device (24).

The thickness-defining device (24) comprises a plurality of rollers (25). These rollers (25) are horizontally positioned in series and are parallel to each other, transverse to the direction of the movement of the dough portion (14), and spaced apart from the conveyor by a distance equal to the desired thickness of the dough. They are held together by a pair of arms (27) on both sides of the rollers by the shafts of each roller being attached to the arms.

The rollers in the upstream portion of this device are driven faster than the conveying speed of the transfer conveyor (13) and the downstream rollers are driven at the same speed as the conveying speed of the transfer conveyor (13). The downstream end of each arm (27) is pivotally connected to each of the joints (not shown) mounted in the frame for the transfer conveyor (13), while the upstream end of each arm is connected to a lifting means (not shown) mounted on the frame of the transfer conveyor (13) so that the arms are lifted or lowered as indicated by the arrows a in FIG. 1. Thus, the connecting arms (27) are pivotally moved about the joints connected to the downstream ends of the connecting arms. Since the upstream ends of the connecting arms (27) are lifted when a dough portion progresses into an area underneath the thickness defining device (24), the dough portion can progress into the area without the upstream rollers interfering with it even if the dough is thicker than the predetermined thickness.

The width-defining members (26) are mounted between the thickness-defining device (24) and the transfer conveyor (13). As shown in FIG. 2, the width-defining members comprise a pair of upright plates whose downstream ends are spaced apart from each other by a distance equal to the desired width of the dough strip. The upstream ends of the width-defining members bend outwardly to provide a wider space between them than their downstream parallel portions. Thus the dough portion (14) can progress into the space between the plates of the width defining members (26) without colliding with the upstream ends of the plates. The plates are connected to a point on the periphery of rotary discs by pins (not shown) so that they are movable in the transverse direction of the transfer conveyor (13) toward and away from each other as indicated by the arrows b in FIG. 2, while they maintain their parallel relationship to each other. Thus the plates push both sides of the dough portion (14) passing therebetween. As a result, the width of the dough portion (14) is regulated so that it equals the predetermined distance, between the plates when they are closest to each other. During the regulation of the dough width the thickness of the dough portion (14) is also defined by the rollers of the thickness-defining device (24) to have a thickness equal to the distance between the lowest part of the most downstream roller (25) of the thickness-defining device (24) and the conveying belt of the transfer conveyor (13). While passing under the thickness-defining device (24) the downstream end part (14d) of the dough portion is unified with the upstream end part (14u) of its preceding dough portion (14) by pressure imparted by the rollers (25), to produce a dough strip (28) from the dough portions (14).

Futher downstream of the thickness-defining device (24) and the width-defining members (26) a crossing roller (30) is positioned above the transfer conveyor (13). The axis of the crossing roller (30) is positioned in the same direction as that of the progress of the dough, as indicated by the arrow d in FIG. 2. The crossing roller (30) is housed in a case (31), and its front and rear ends are rotatably supported by the ends walls of the case. A rail (not shown) is mounted above the transfer conveyor (13) in its transverse direction and acts as a guide for the crossing roller (30) so that the crossing roller (30) is movable in the transverse direction, as indicated by the arrow c in FIG. 2. The crossing roller (30) is freely rotatable about its axis. Thus when the crossing roller (30) is mounted, it stretches the dough strip (28) in the lateral direction to have a wider width.

Downstream of the transfer conveyor (13) an apparatus (32) for quantifying the flow rate of the dough is provided. The quantifying apparatus (32) not only quantifies the flow rate but also more precisely regulates the dimensions of the dough. The apparatus (32) comprises a variable-speed dough feed conveyor (34) having a weighing device (35), a constant-speed conveyor (36) provided thereon, a width-defining device (38), and a roller mechanism (40) disposed over both conveyors (34, 36) and having an endless roller path with a straight portion facing the conveyors. The roller mechanism (40) comprises a plurality of rollers freely rotatable about their axes and movable along the endless path. The feed conveyor (34) is positioned downstream of and adjacent the transfer conveyor (13) so that the feed conveyor (34) receives the dough strip (28) from the transfer conveyor (13) and feeds it to the space formed between the roller mechanism (40) and the two conveyors (34, 36). Since the dough strip (28) is thickened or stretched, depending on the weight of portions of the dough, by changing the speed difference of the two conveyors (34, 36), a dough strip of a more precise and uniform thickness and width, suitable for a further process, can be produced.

Since the feed conveyor (34), is controlled to be driven at a speed inversely proportional to the weight of the dough portion measured by the weighing device (35), the transfer conveyor (13) of the apparatus (2) is also controlled to be driven at the same speed as the feed conveyor (35). In this preferred embodiment, the downstream driven roller of the transfer conveyor (13) and the upstream driven roller of the feed conveyor (34) are connected by an endless chain (not shown). The quantifying apparatus (32) is disclosed in U.S. Pat. No. 4,692,107 and is incorporated in this specification by reference.

In FIG. 3 the control unit (18) comprises a memory and an arithmetic circuit. The control unit (18) receives the weight data of the dough portion measured, and the travel distance data from the weighing device (12) and the encoder (20), and sends signals to the driving means for the weighing and supplying conveyor (10) and the driving means for the cutter blades of the divider (8) so that their movements can be controlled. The function of the control unit will now be discussed in detail by reference to the operation of the apparatus (2) of this invention.

In operation, first, when a proximity switch (not shown) detects that the weighing and supplying conveyor (10) has returned to the original position, which is directly beneath the hopper (4), the control unit (18) sends a signal to the divider (8) to open the cutter blades so that the exit port of the hopper (4) is open. When the exit port (16) is opened, a portion of the dough contained in the hopper (4) progresses through the exit port and drops onto the weighing and supplying conveyor (10). After a predetermined period the control unit (18) sends a signal to the divider (8) to close the cutter blades. Thus the exit port (16) closes and the dough portion (14) on the weighing and supplying conveyor (10) is cut by the cutter blades and separated from the dough mass (6) in the hopper (4). Then the weighing device (12) measures the weight of the dough portion (14). As stated above, the weight of the dough portion (14) supplied from the hopper (4) is not precisely regulated in this invention. Thus, the weight of the dough portions (14) may vary.

The weight of the dough portion (14) is stored in the memory of the control unit (18). In this apparatus, the operator inputs information regarding the unit weight of the dough, that is, the weight of the dough per unit volume obtained by multiplying the unit length by the predetermined width and by the predetermined thickness and by setting a unit weight dial (42) before the operation starts. The predetermined width and thickness are a given width and thickness, to which the width and thickness of a dough portion (14), are regulated. The unit weight Gu per unit volume can be readily calculated using the specific gravity of the dough material.

In the arithmetic circuit in the control unit (18) the length of each dough portion of a given thickness and a given width is calculated based on the assumption that the dough portion takes the form of a rectangular parallelepiped, based on the unit weight Gu and the weight of the dough portion measured. For example, assuming that the thickness and width are set at 2 cm and 30 cm respectively, and the unit length is set at 1 cm, the unit volume is 60 cm$^3$. When the unit weight Gu of a dough portion of a unit volume 60 cm$^3$ is found to be 60 g, a dough portion of 2400 g should have a length of 40 cm at the same given thickness and width, so long as the dough portion has the same composition and consistency.

Thus, in general, the length L of the dough portion of a given thickness and a given width can be calculated by the following equation:

$$L = \frac{Ga}{Gu}$$

In this equation Ga indicates the total weight of the dough portion, and Gu indicates the unit weight of the dough.

Dough portions (14) are supplied to the transfer conveyor (13) one after another to be placed serially on the conveying path of the transfer conveyor (13).

According to this invention, because the dough portion is to have a given width and thickness, the length of the dough portion should be proportional to its weight. Thus the weighing and supplying conveyor (10) supplies the dough portion to the transfer conveyor (13) when the transfer conveyor (13) has conveyed the preceding dough portion a distance D, which distance D is proportional to the weight of the preceding dough portion.

However, the distance D may take a different value from the calculated length of the dough portion (14). The distance D, a factor in determining the time to supply the dough portion (14), is determined based on the characteristics of the dough portion (14), as will be discussed below.

The calculation of the distance D will now be discussed in detail.

If the distance D is chosen so that it becomes equal to the calculated length L of the dough portion (14) at its given thickness and width, the upstream end portion (14u) of the preceding dough portion, and the downstream end portion (14d) of the subsequent dough portion, will contact each other, especially when the preceding and subsequent dough portions have passed the thickness-defining device (24) and the width-defining members (26).

In this preferred embodiment, the distance D is chosen to be shorter than the calculated length L of the dough portion (14) so that the downstream end portion (14d) of the subsequent dough portion is ensured to always overlap the upstream end portion (14u) of the preceding dough portion when the subsequent dough portion is placed on the transfer conveyor (13), as shown in FIG. 1.

When the dough portion has high elasticity it is difficult to stretch it and to unify it with the adjacent dough portions. The end part of such a dough portion sometimes fails to contact the end part of the preceding dough portion when it is placed on the transfer conveyor (13). Further, if the dough portion is thick, its downstream end part may be far removed from the upstream end part of the preceding dough portion before its width and thickness are regulated. Therefore, by placing the dough portions on the transfer conveyor (13) so that they overlap one another on their end portions, it is ensured that they will become contiguous with each other after they pass through the thickness-defining device (24). Naturally, the increase in the volume of the overlapping portion increases the width and thickness. Thus the space between the rollers (25) of the thickness-defining device (24) and the conveying path of the transfer conveyor (13), or the distance between the two width defining means, should be adjusted.

To provide such overlapping end portions (14d, 14u) at a predetermined ratio, the relation between the distance D, over which the transfer conveyor conveys a dough portion, as discussed above, and the calculated length L of the dough portion, should be indicated as follows:

$$\frac{D}{L} = X \, (X < 1) \qquad (2)$$

From this, the following equation can be derived:

$$D = LX \qquad (3)$$

When the value of X is properly chosen based on characteristics of the dough material such as viscosity or elasticity, the downstream end part of a dough portion always overlaps the upstream end part of the preceding dough portion. In this preferred embodiment the operator can set the value X by setting the dial (44 in FIG. 3), and this value is stored in the memory of the control unit (18). The value is also indicated on an indicator (46).

Based on the distance calculated by the arithmetic circuit in the control unit, a signal is given the weighing and supplying conveyor (10) to cause it to supply a dough portion (14) on the area directly underneath the exit port (16) of the hopper (4). In this preferred embodiment, the encoder (20) counts the marks on the conveyor belt to measure the travel distance of the transfer conveyor (13) and sends a signal to the weighing and supplying conveyor (10).

In response to the signal from the encoder (20), the conveying belt of the weighing and supplying conveyor (10) is driven while its frame starts to move back as indicated by the arrow m in FIGS. 1 and 3.

When the weighing and supplying conveyor (10) finishes supplying the dough portion to the transfer conveyor (13), the weighing device (12) detects the absence of any weight and sends a zero signal to the control unit (18). The control unit (18) then sends a signal to have the weighing and supplying conveyor (10) return to its original position to receive a subsequent dough portion from the hopper (4).

As was discussed above, the downstream end part (14d) of the dough portion (14) on the transfer conveyor (13) overlaps the upstream end part (14u) of its preceding dough portion as shown in FIG. 2. A third dough portion entering the space between the two width-defining members (26) is shown in FIG. 2 by a dotted line.

The dough portion (14) on the transfer conveyor (13) is first stretched by the single roller (22). However, since in most cases material such as dough has a specific thickness determined by its form-retention characteristics when it is placed on a flat surface, the single roller (22) can be eliminated unless the thickness is too great for the dough portion to pass under the rollers of the thickness-defining device (24).

The dough portion (14) is then transferred to a space between the plates of the width-defining members (26) and under the thickness-defining device (24). In this preferred embodiment the rollers of the thickness-defining device (14) are constructed so that the upstream rollers are driven at a speed faster than the conveying speed of the transfer conveyor (13), and the downstream rollers are driven at the same speed as that of the transfer conveyor (13). Since the upstream rollers are driven faster than the progress of the dough portions, the travel speed of the upper surface of the dough portion (14) progressing under such rollers is faster than that of its lower surface. Thus, the interface between the preceding dough portion and the subsequent dough portion (indicated by a dotted line in FIG. 1) becomes forwardly inclined so that the upper part of the downstream end of the subsequent dough portion rides on the lower part of the trailing end of the preceding dough portion, and the overlapping area increases as shown in FIG. 1. Thus, even if the distance D is set at a value that is equal to the calculated length, such a construction of the rollers ensures that the end parts (14u, 14d) of the dough portions contact firmly each other. The rollers also press the dough portions to cause them to have a predetermined thickness. Due to the pressure applied, the overlapping parts (14d, 14u) of the dough portions become unified. The dough portions are also pressed on both sides by the plates of the width-defining members (26). Accordingly, the dough portion is regulated to have a predetermined width. As a result, a dough strip (28) of a predetermined width and thickness is provided when the dough portions pass the thickness-defining device (24) and the width-defining device (26).

The dough strip (28) is then stretched by the crossing roller (30) before it is fed to stretching or other processing apparatuses for further process. The crossing roller (30) further stretches the dough strip to have a wider width as shown in FIG. 2.

In this embodiment, the dough strip (28) thus treated is supplied to the quantifying apparatus (32). In the apparatus (32) the dough strip (28) is made completely uniform with more precisely regulated processing steps. However, the step performed by the apparatus (32) can be eliminated in various applications.

Figure 4:
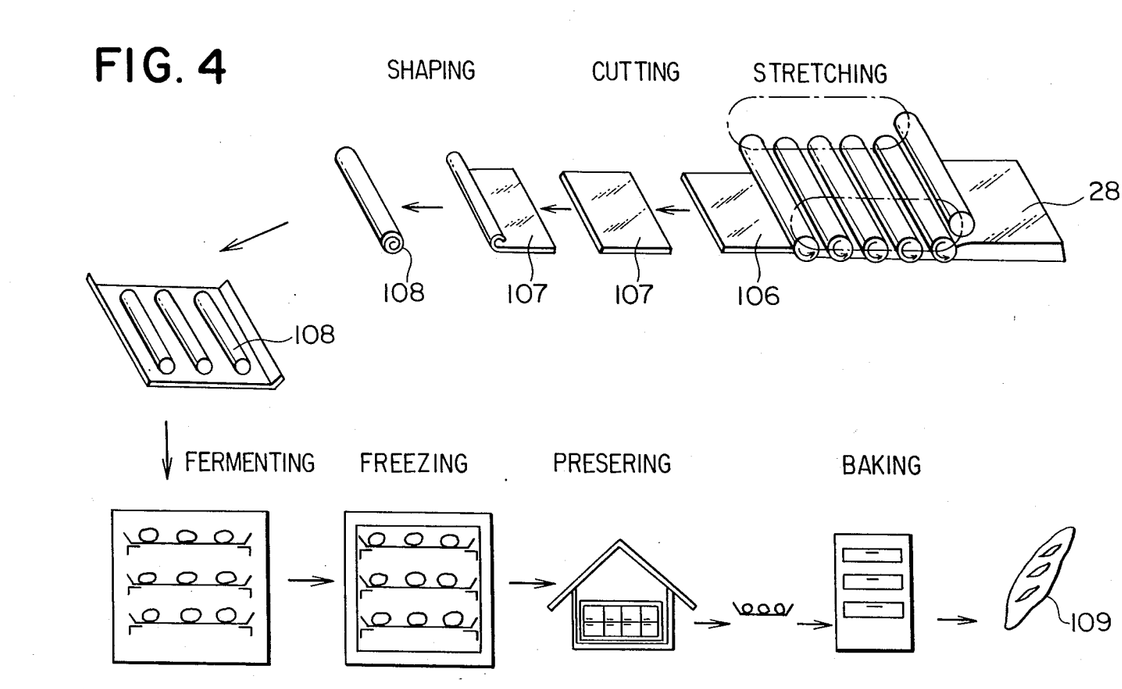
FIG. 4 shows the second half of the method of this invention for producing French bread.

According to this invention, dough portions supplied from the hopper (4) are unified into a continuous dough strip. The width and thickness of the dough strip are precisely regulated, and thus a dough strip of substantially uniform dimensions is produced at a substantially constant flow rate. The dimensions of the dough are chosen to accommodate further processing. Therefore, the dough is usually supplied to the cutting and shaping step without passing through a further stretching step. However, if the thickness of the dough strip needs to be further stretched, it is supplied to a stretching step. In this embodiment, a stretching step is included. FIG. 4 shows the second half of the method of this embodiment.

In this embodiment the dough is stretched while it is subjected to vibrations. The apparatus that performs such a stretching step is shown in FIGS. 5 and 6.

Figure 5:
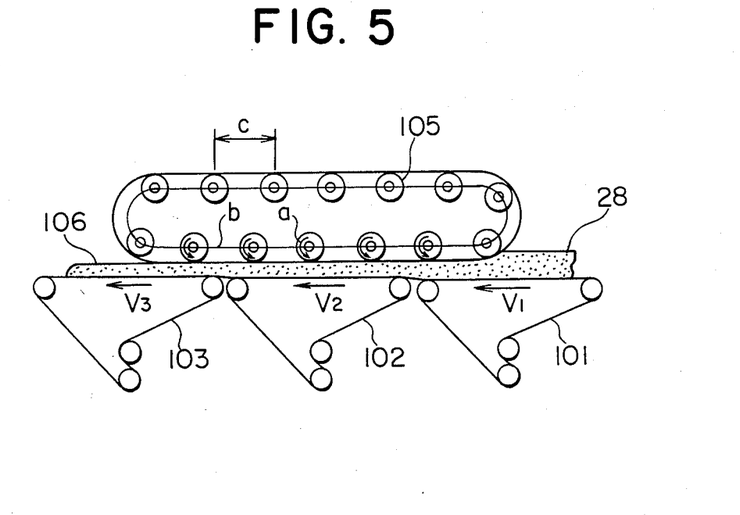
FIGS. 5 and 6 show stretching apparatuses in which the stretching step of this invention is performed.
Figure 6:
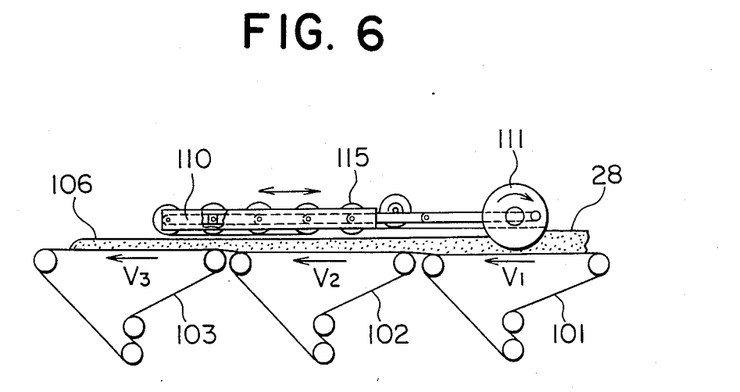

In FIG. 5 dough is stretched by placing the dough strip (28) on the conveying path formed by three conveyors (101)(102)(103). These conveyors are arranged serially and driven at different speeds. The relation between the speed ($V_1$) of the first conveyor (101), the speed ($V_2$) of the second conveyor (102), and the speed ($V_3$) of the third conveyor (103), is:

$$V_1 < V_2 < V_3.$$

When the dough strip (28) is placed on the conveying path so as to extend over two or three of the conveyors (101, 102, 103), tension is continuously imparted to the dough strip (28).

Above the conveying path of the conveyors (101, 102, 103) a roller mechanism is arranged that has a plurality of rollers (105) freely rotatable about their axes in the direction shown by the arrow a and movable along an endless roller path in the direction shown by the arrow b. The roller mechanism may be mounted to a base in any conventional way. The rollers (105) are mounted by means of bearings around their shafts so as to be freely rotatable. The movement of the rollers in the direction b is faster than the movement of any of the conveyors. The rollers (105) are arranged so that the distance c between any adjacent pair of the rollers (105) is short enough so that uniform vibrations are always provided throughout the dough located between the conveyors (101, 102, 103) and the roller mechanism. Such a roller mechanism is disclosed in U.S. Pat. No. 4,192,636, which is explained in page 1 and incorporated herein by reference.

By arranging the rollers (105) above the conveyors (101, 102, 103), the dough strip (28) is pressed by the moving rollers against the conveying path, and is effectively stretched by the conveyors, while rotating and moving the rollers (105) in the directions of the arrows a and b. Thus the dough strip (28) is continuously subjected to vibrations and tension.

When the rollers (105) press a certain area of the dough strip (28) against the conveying path which consists of more than one of the conveyors (101, 102, 103), the area of the dough is stretched by a tensile pressure caused by the difference in the speeds of the conveyors (101, 102, 103), and temporarily becomes thinner. The area of the dough strip (28) is then released from the rollers (105) when the rollers (105) move away from the area, and the area of the dough partially recovers its thickness due to its elasticity. Such a process is repeated and the pressure in the dough is repeatedly imparted and removed, which causes vibrations in the dough. As a result fluidity appears in the dough because of the vibrations. Such a phenomenon is called a thixotropic effect, and the area of the dough mass is stretched and becomes permanently thinner without a pressure higher than the yield point of the elasticity of the dough having been imparted. Thus in this invention no high pressure that might damage the gluten network structure of the dough is imparted to the dough.

FIG. 6 shows another roller mechanism to stretch the dough without subjecting it to a pressure greater than the yield point of its elasticity. This roller mechanism includes a plurality of rollers (115) freely rotatable about their axes along a straight path. These rollers (115) are connected by a pair of connecting arms (110) at both their ends. Each of the arms (110) is eccentrically connected at its upstream end to a disc (111) that moves the rollers (115) back and forth along the straight path. Such a roller mechanism is disclosed in U.S. Pat. No. 4,692,110, which is incorporated herein by reference.

When dough is stretched by the above-mentioned processes, pressure of only about 70 g/cm$^2$ or less, which is very low compared with the conventional stretching processes, is applied to the dough. Thus, neither is the elasticity in the dough stretched lost nor is the network structure of the gluten damaged.

In FIG. 4 the dough stretched is then cut and shaped into a desired form. The stretched dough sheet (106) is cut into pieces (107) having any desired dimensions and then rolled into roll bars (108).

Figure 7:
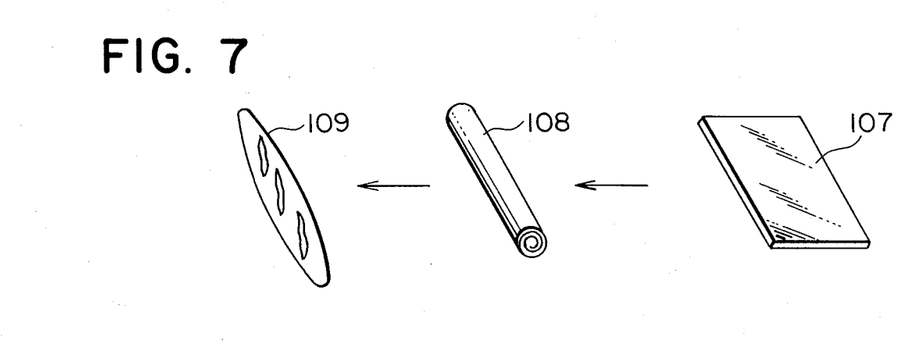
FIG. 7 shows the sequence of steps to shape a dough piece into the form of French bread.

In FIG. 7 the steps for shaping a dough piece (107) into the form of French bread are shown. A rectangular dough piece (107) is rolled into a roll bar (108) and shaped into a long spindle form. Then some incisions are provided, resulting in dough in the form of French bread (109).

Figure 8:
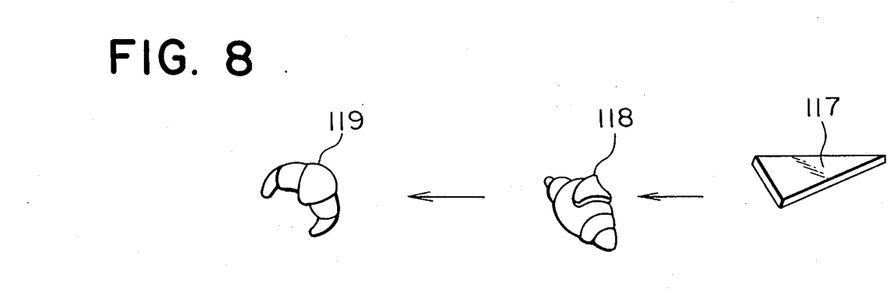
FIG. 8 shows the sequence of steps to shape a dough piece into the form of a croissant.

Naturally any type of bread can be produced from the dough sheet (106). FIG. 8 shows the steps for shaping a dough piece into the dough of a croissant form. In this embodiment, before the dough is shaped into a form of a croissant, a fat layer is applied on the surface of the dough sheet (106). The dough sheet (106) is then folded to sandwich the fat layer, thereby producing pastry dough having many fat layers. Then such a dough sheet (106) is stretched and cut into triangular dough pieces (117). The dough piece (117) is rolled up into a spindle shape (108) and then shaped into an arched form (119).

As shown in FIG. 4, the next step is a fermentation step. The dough for a croissant shaped into a desired form (119) is subjected to a temperature of 34° C., and a humidity of 80%, for 50 minutes. These are the conventional conditions for the fermentation of croissant dough. Then the dough is baked to provide finished bread. Since the dough is not subjected to any excessive pressure, the gluten network structure of the dough is not destroyed. Thus bread or pastry having an excellent quality can be provided.

Further, it has been discovered that such dough can be preserved for a long time and its good quality maintained. Therefore, in this embodiment the dough is frozen. The dough is taken out of the freezer and then baked so that fresh bread or pastry made of the bread can be served at any time.

When the dough is preserved as shown in FIG. 4, the dough (108) is put in a freezing room and subjected to a temperature of about −40° C., to rapidly freeze it.

Then the frozen dough is preserved in a freezing room or freezer for any desired period. The dough thus preserved can be sold to consumers, who can continue preserving the dough in their own freezers.

The dough is then taken out of the freezing room or freezer and baked. A finished croissant produced from frozen dough fermented under conventional conditions attains a specific volume of 4.5–5.5 cc/g and has a satisfying quality. The dough of this invention is deflated only a little because the gluten structure is not harmed during the freezing step. It expands sufficiently during the baking step and becomes puffy and tasty bread. Such bread has almost the same good quality as that produced from dough that has not been preserved.

To further improve the quality of the finished bread, the dough of this invention is fermented under special conditions in which the temperature is lower and the time period is longer than in the conventional method. Where the dough is for a croissant, the dough is subjected to a temperature of about 30° C., and a humidity of about 80%, for about 70 minutes. When dough is fermented under these special conditions, the dough expands more than dough fermented under the conventional conditions. Such extra expansion can compensate for the slight deflation of the dough during the freezing step. Thus, finished bread of an improved quality can be produced. The finished croissant produced from the dough of this invention and fermented under these special conditions attains a specific volume of 5.5-6 cc/g.

Although we explained the special conditions for croissant dough, each type of bread dough may have its own special conditions for sufficient expansion. For example, where the dough is for French dough, the dough is preferably subjected to a temperature of about 32° C., and a humidity of about 80%, for about 90 minutes. In contrast the conventional conditions are 34° C., 80% humidity, for 70 min.

As discussed above, by this invention shaped dough pieces are provided without an excessive pressure being imparted to them. Therefore the gluten network structure is not harmed, and bread or pastry having an excellent quality can be provided when the dough is baked. Further, the steps for preparing a dough mass and subjecting it to the step to provide a dough strip having uniform dimensions are performed automatically and continuously.

We claim:

1. A method for producing dough for bread or pastry comprising the steps of:
   (a) mixing and kneading materials required for producing a desired type of bread, to make a dough mass,
   (b) dividing the dough mass into portions,
   (c) weighting each of said dough portions,
   (d) placing said dough portions serially on a feed conveyor in a manner which causes each of said dough portions to occupy a length on the conveyor proportional to the weight of the dough portion,
   (e) regulating the width and thickness of each said dough portion to form a continuous dough strip of uniform dimensions,
   (f) cutting and shaping said dough strip into dough pieces of a desired form, and
   (g) fermenting said dough pieces.

2. The method of claim 1, further comprising a step of stretching said dough strip while subjecting it to vibrations.

3. The method of claim 1, further comprising a step of applying fat to the surface of the dough strip to form a fat layer on a dough layer and folding said dough strip to sandwich the fat layer between portions of the folded dough strip, thereby producing pastry dough.

4. The method of claim 2, further comprising a step of applying fat to the surface of the stretched dough strip to form a fat layer on a dough layer and folding said dough strip to sandwich the fat layer between portions of the folded dough strip, thereby producing pastry dough.

5. The method of claim 1, further comprising the steps of:
   (a) freezing said dough pieces, and
   (b) preserving said frozen dough pieces for a desired length of time.

6. The method of claim 2, wherein said stretching is accomplished by pulling said dough strip while subjecting said dough strip to vibrations, so that a pressure of no more than approximately 70 g/cm$^2$ is imparted to said dough strip.

7. The method of claim 1, wherein said fermenting step comprises a step of subjecting said dough pieces to a predetermined temperature and humidity for a predetermined time period.

8. The method of claim 7, wherein said temperature is about 30° C., said humidity is about 80%, said period is about 70 minutes and where said desired type of bread is a croissant.

9. The method of claim 7, wherein said temperature is about 32° C., said humidity is about 80%, said period is about 90 minutes and where said desired type of bread is French bread.

10. The method of claim 2, wherein said stretching step comprises placing said dough strip on a conveying path having a plurality of conveyors arranged in series and driven at different speeds so that each of the conveyers is faster than a corresponding upstream conveyor while said dough is held on the conveying path and providing a roller mechanism having a plurality of rollers positioned above said conveyer path to stretch said dough strip.

11. The method of claim 10, wherein said plurality of rollers are freely rotatable about their axes and movable along an endless roller path, the peripheries of the moving rollers forming a closed envelope.

12. The method of claim 2, further comprising the steps of:
   (a) freezing said dough pieces, and
   (b) preserving said frozen dough pieces for a desired length of time.

13. The method of claim 3, further comprising the steps of:
   (a) freezing said dough pieces, and
   (b) preserving said frozen dough pieces for a desired length of time.

14. The method of claim 4, further comprising the steps of:
   (a) freezing said dough pieces, and
   (b) preserving said frozen dough pieces for a desired length of time.

15. The method of claim 1 wherein at least one of said materials is selected from the group consisting of yeast, water, sugar and flour.

* * * * *

UNITED STATES PATENT AND TRADEMARK OFFICE
CERTIFICATE OF CORRECTION

PATENT NO. : 4,904,491

DATED : February 27, 1990

INVENTOR(S) : Michio Morikawa et al.

It is certified that error appears in the above-identified patent and that said Letters Patent is hereby corrected as shown below:

On the title page:
Assignee: Rheon Automatic Machinery Co., Ltd., address should be --Utsunomiya-- not Tokyo.

Figure 4: "PRESERING" should read -- PRESERVING--

Col. 1 Line 15: delete "it" (second occurrence)

Signed and Sealed this

Ninth Day of July, 1991

Attest:

HARRY F. MANBECK, JR.

*Attesting Officer*  *Commissioner of Patents and Trademarks*